United States Patent [19]
Lees et al.

[11] Patent Number: 5,833,421
[45] Date of Patent: Nov. 10, 1998

[54] CONNECTOR PLATE

[75] Inventors: William F. Lees, Bedford, Tex.; Robert N. Emerson, Pullman, Wash.

[73] Assignee: Alpine Engineered Products, Inc., Pompano Beach, Fla.

[21] Appl. No.: 710,369

[22] Filed: Sep. 16, 1996

[51] Int. Cl.⁶ .................................................. F16B 15/00
[52] U.S. Cl. ...................... 411/466; 411/921; 403/405.1; 52/712; 52/655.1; 52/656.9; 52/DIG. 6
[58] Field of Search ........................... 411/466–468, 921; 403/283, 405.1; 52/712, 655.1, 656.9, DIG. 6

[56] References Cited

U.S. PATENT DOCUMENTS

| | | |
|---|---|---|
| Re. 31,807 | 1/1985 | Knowles . |
| 3,016,586 | 1/1962 | Atkins . |
| 3,241,424 | 3/1966 | Moehlenpah et al. . |
| 3,242,788 | 3/1966 | Broder ................................ 411/921 X |
| 3,322,018 | 5/1967 | Moehlenpah et al. . |
| 3,362,277 | 1/1968 | Moehlenpah et al. . |
| 3,417,651 | 12/1968 | Moehlenpah . |
| 3,417,652 | 12/1968 | Menge . |
| 3,479,919 | 11/1969 | Lidsky . |
| 3,479,920 | 11/1969 | Sanford . |
| 3,480,305 | 11/1969 | Jureit . |
| 3,498,170 | 3/1970 | Sanford . |
| 3,498,171 | 3/1970 | Jureit . |
| 3,603,197 | 9/1971 | Wood . |
| 3,633,454 | 1/1972 | Schmitt et al. . |
| 3,667,337 | 6/1972 | Burke . |
| 3,731,583 | 5/1973 | Jureit . |
| 3,841,194 | 10/1974 | Moehlenpah . |
| 3,841,195 | 10/1974 | Jureit . |
| 3,892,160 | 7/1975 | Jureit et al. . |
| 3,899,803 | 8/1975 | Burmlik . |
| 3,946,532 | 3/1976 | Gilb . |
| 3,951,033 | 4/1976 | Moehlenpah ............................ 411/468 |
| 4,235,148 | 11/1980 | Menge . |
| 4,274,241 | 6/1981 | Lindal . |
| 4,297,048 | 10/1981 | Jureit et al. . |
| 4,299,511 | 11/1981 | Demers . |
| 4,343,580 | 8/1982 | Moyer et al. . |
| 4,366,659 | 1/1983 | Jensen . |
| 4,410,294 | 10/1983 | Gilb et al. . |
| 4,418,509 | 12/1983 | Moyer et al. . |
| 4,423,615 | 1/1984 | Moyer et al. . |
| 4,486,115 | 12/1984 | Rionda et al. . |
| 4,586,550 | 5/1986 | Kitipornchai ....................... 52/DIG. 6 |
| 4,630,424 | 12/1986 | Eberie et al. . |
| 4,639,176 | 1/1987 | Smith et al. . |
| 4,641,480 | 2/1987 | Mort . |
| 4,659,604 | 4/1987 | Lambuth . |
| 4,694,675 | 9/1987 | Mort . |
| 4,710,083 | 12/1987 | Wolf . |
| 4,734,003 | 3/1988 | Smith et al. . |
| 4,964,774 | 10/1990 | Lat et al. . |
| 5,071,280 | 12/1991 | Turner . |
| 5,116,179 | 5/1992 | Matlock . |
| 5,234,279 | 8/1993 | Poutanen . |
| 5,440,977 | 8/1995 | Poutanen . |
| 5,553,961 | 9/1996 | Oldes ............................... 405/405.1 X |

*Primary Examiner*—Robert Canfield
*Attorney, Agent, or Firm*—Crutsinger & Booth

[57] ABSTRACT

The connector plate has a rigid, planar base, and a plurality of adjacent elongated slots defined in said metal plate. The slots are offset in a sinusoidal pattern having at least one cycle with a maximum amplitude slot position, minimum amplitude slot position and at least two zero-point slot position. Each slot has first and second reverse-oriented mirror-image teeth extending from the plate at opposing ends of each slot.

15 Claims, 5 Drawing Sheets

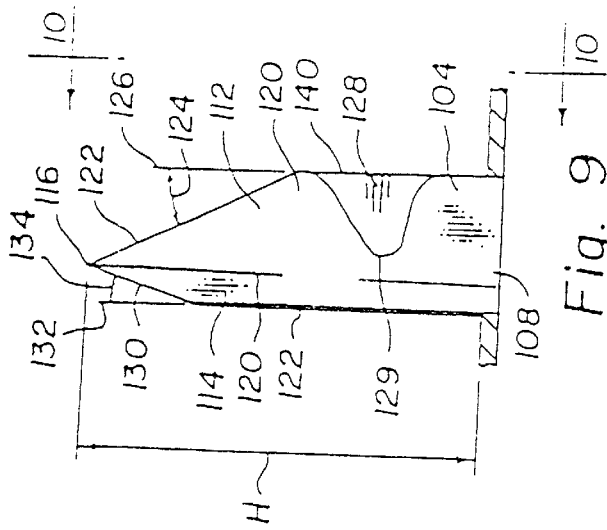
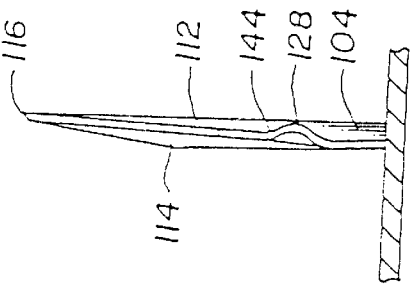
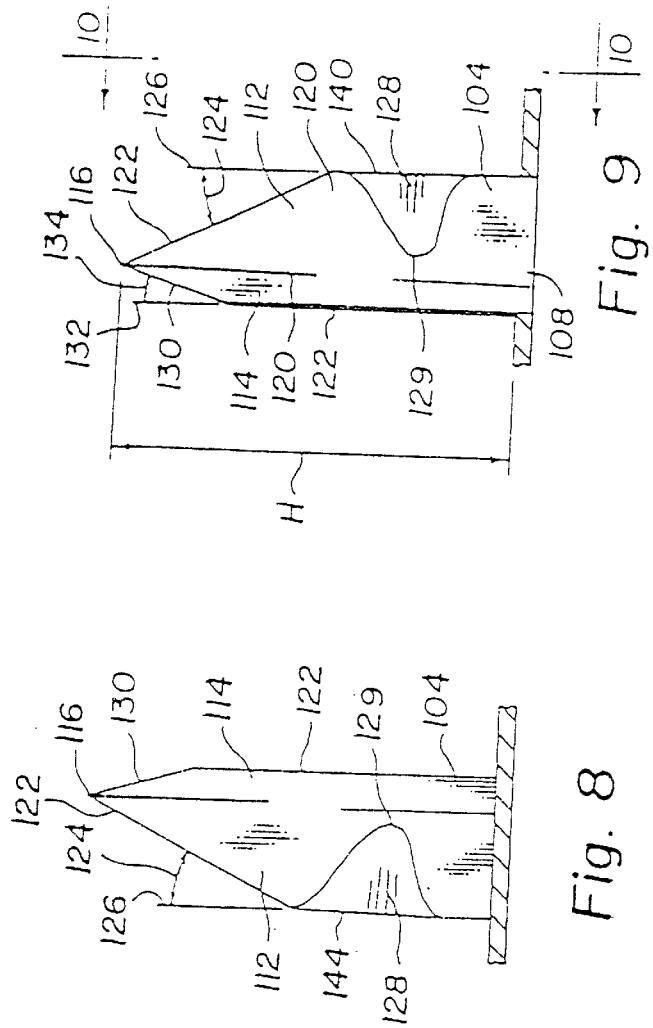
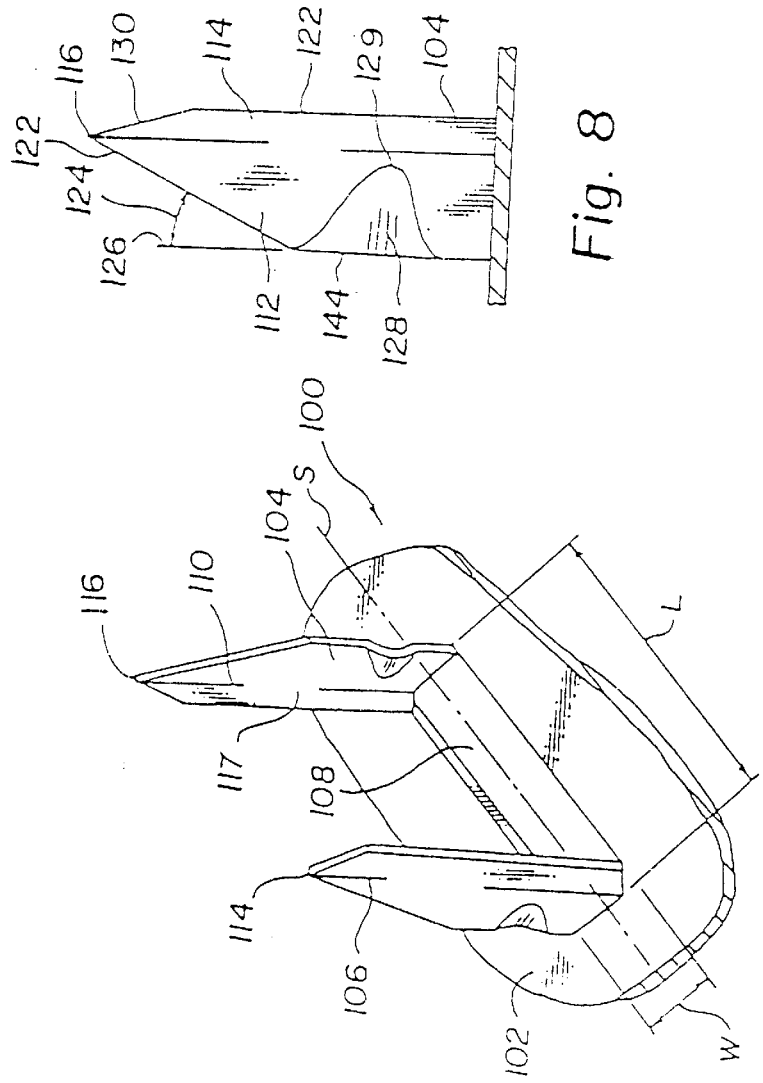

CONNECTOR PLATE

TECHNICAL FIELD

This invention relates to a connector plate used to connect structural members to form trusses or other structural frames. More particularly this invention relates to increased connector plate tooth-holding capacity and sinusoidal-wave tooth deployment design features.

BACKGROUND OF THE INVENTION

Connector plates are used for connecting wood members to form trusses, joists, beams and the like. For convenience, connector plates are discussed herein with respect to truss assemblies. These plates are made of thin, rigid-sheet steel, such as galvanized steel. These plates have integrally-formed teeth that are embedded into adjacent wood members to form a joint.

The connector plates are typically installed by first laying out the truss members to be connected. A connector plate is positioned to overlap the joint and is then pressed into the wood by a suitable compression clamp or gantry press so that the connector plate teeth are embedded into the wood.

Truss members may be in the form of 2-by-4 lumber, 2-by-6 lumber, or the like, and can be positioned to form different truss designs. For example, two truss members can be arranged side-by-side and joined together to form a double-thick beam. As another example, the abutting ends of aligned truss members may be joined together to form a double-length member. As a further example of a truss construction, the end of one wood member can be cut at an angle that is abutted against a second wood member. These members can be joined together by a connector plate, forming a V-shaped joint.

Connector plates are fabricated and sold with known design characteristics. Particularly, connector plate designers seek connector plates having high steel efficiencies for tension and shear forces and high tooth-holding-capacity values. These characteristics dictate the surface area of the connector plate and the number of plates needed to complete a truss design. Commonly, in the presence of higher shear loads, the number of plates, the size and thicknesses of the plates and the number of their teeth are typically increased. But a connector plate designer is limited by the steel material capacities. Accordingly, improved connector designs reduce the cost of the construction in labor costs, materials costs and design costs. With respect to truss designers, computer software is available to select commercial connector plates.

Presently, connector plate designers are guided by truss design standards set by their trade associations, such as the Truss Plate Institute ("TPI") and by the model building codes. These standards have been developed by structural engineers, model building code staff, university professors, design professionals, and truss manufacturers. For example, the steel standards, procedures, and production tolerances used for metal connector plate manufacturing established by TPI require a minimum steel grade of ASTM A653, hot dipped galvanized coating of G-60, and a minimum yield stress of 33,000 psi. Furthermore, the quality of the steel used by association member companies in the manufacture of connector plates is monitored by TPI.

Recently, TPI set out the TPI 1-1995 industry standard. This standard specifies that metal-plate-connected truss joints shall be designed for a lateral resistance interpolated between design values: Vlraa, Vlrae, Vlrea, and Vlree.

Referring to FIG. 1, Vlraa is the allowable lateral resistance value for metal connector plates loaded parallel to the grain with the plate axis (tooth slots) parallel to the load. Referring to FIG. 2, Vlrae is the allowable lateral resistance value for metal connector plates loaded perpendicular to the load. Referring to FIG. 3, Vlrea is the allowable lateral resistance value for metal connector plates loaded parallel to the grain with the plate axis (tooth slots) perpendicular to the load. Referring to FIG. 4, Vlree is the allowable lateral resistance value for metal connector plates loaded perpendicular to the grain with the plate axis (tooth slots) perpendicular to the load.

The lateral tooth holding resistance of a joint at any arbitrary orientation is determined through three interpolations. For example, FIG. 5 illustrates a plate connector in an arbitrary orientation with the designated angles $\theta$ and $\alpha$. Angle $\theta$ is the angle between the force and the grain (piece). Angle $\alpha$ is the angle between the force and the plate.

The first two interpolations are Hankinson's interpolations between the force and the grain (the piece). The first Hankinson interpolation, Vlra$\theta$, calculates the allowable value for metal connector plates loaded at an angle $\theta$ to the grain with the plate axis (tooth slots) parallel to the load, as a function of the Vlraa and Vlrae orientations:

$$V_{LRA\theta}=(Vlraa)(Vlrae)/(Vlraa)\sin^2\theta+(Vlrae)\cos^2\theta$$

The second Hankinson interpolation, Vlre$\theta$, calculates the allowable value for metal connector plates loaded at an angle $\theta$ to the grain with the plate axis (tooth slots) perpendicular to the load, as a function of the Vlrea and Vlree orientations:

$$V_{LRE\theta}=(Vlrea)(Vlree)/(Vlrea)\sin^2\theta+(Vlree)\cos^2\theta$$

The third interpolation is a linear interpolation between the force and the plate, that is, between the $V_{LRA\theta}$ and $V_{LRE\theta}$ orientations:

$$V_{LR\theta}=V_{LRA\theta}+(\alpha/90°)(V_{LRE\theta}-V_{LRA\theta})$$

where:
  $\alpha$=|Plate Angle−Force Angle|If $\alpha$>then $\alpha=\alpha-180$ If $\alpha$>90 then $\alpha=180-\alpha$
  $\theta$=|Piece Angle−Force Angle|If $\theta$>180 then $\theta=\theta-180$ If $\theta$>90 then $\theta=180-\theta$ The Tooth Holding Allowable value is then calculated by the following:
  TH Allowable=(VLR$\theta$)(number_of_plates)(Heel_Reduction)(Plate Area)

Some commercially-available connector plates have staggered-tooth configurations to tooth-holding capacity and increase steel efficiency. For example, U.S. Pat. No. 4,343,580, issued to Moyer et al., discloses a structural joint connector in which the rows of teeth are offset from each other by a stagger distance. One of the objectives recited is to provide an improved structural joint formed by two wooden members abutted together and interconnected by an improved connector plate.

Other connector plates have adopted designs with twisted teeth with bend lines that are offset relative to central longitudinal axis of the slots. For example, U.S. Pat. No. 4,374,003, issued to Smith, discloses such an offset bend line with the tooth twisted angularly around its bend line, such that the tooth intertwines and twists with the wood fibers to resist loosening when the wood moves, expands, swells, or the like.

But further improvements are always sought that increase connector plate tooth-holding capacity and the steel efficiency. Such improvements allow the connector plate size to decrease, in turn recognizing economic savings in the cost of materials. Further, greater capacities avoid the creation of a greater variety of truss designs.

SUMMARY OF THE INVENTION

Thus, the connector plate herein provides improved resistance capacity in both tooth-to-load and tooth-to-wood grain in the four orientations as set out by TPI 1-1995. The connector plate has a rigid, planar base, and a plurality of adjacent elongated slots defined in said metal plate. The slots are offset in a sinusoidal pattern having at least one cycle with a maximum amplitude slot position, a minimum amplitude slot position and at least two zero-point slot position. Each slot has first and second reverse-oriented mirror-image teeth extending from the plate at opposing ends of each slot.

In another aspect of the invention, a connector plate is provided having a metal plate, a plurality of elongated slots with a tooth extending from each opposing end of the slot. The elongated slots are defined in the plate and are arranged in at least one row. Each row forms a generally cyclical waveform. Each tooth extends substantially perpendicular to the plate from each opposing end of each of said elongated slots and has a base with a bend spine. The bend spine originates apart from a longitudinal axis of its slot and extends to a tip. First and second asymmetrical portions having extruded edges extend generally laterally from the bend spine extending to the tip. The first portion having less taper than the second portion. A tapered corrugation is formed in the second portion of the tooth adjacent the tooth base. The corrugation extends from the outer edge of the second portion with a tapered end extending towards the bend spine.

In yet another aspect of the invention, a punch for forming a staggered struck-out opening is provided. The punch has a base portion with a longitudinal axis, a shank, and a strike-out tip.

The shank has an elongated cross-section that extends from the base portion such that a shoulder is formed in the transition from the shank to the base portion for supporting the punch in a set of wave die sections. The shank has a longitudinal axis offset from the longitudinal axis of said base portion. The strike-out tip is on an end of the shank for forming a struck-out elongated opening having at least one tooth extending from an end of the opening.

BRIEF DESCRIPTION OF THE DRAWING

The accompanying drawing is incorporated into and forms a part of the specification to illustrate an example of the invention. The figures of the drawing together with the description serve to explain the principles of the invention. The drawing is only for the purpose of illustrating preferred and alternative examples of how the invention can be made and used and is not to be construed as limiting the invention to only the illustrated and described example. The various advantages and features of the present invention will be apparent from a consideration of the drawing in which:

FIG. 7 is a perspective view of one pair of teeth formed on the ends of an elongated slot;

FIG. 8 is a plan view of an exterior surface of one of the teeth;

FIG. 9 is a plan view of an interior surface of one of the teeth;

FIG. 10 is a side plan view of one of the teeth taken along line 10—10 shown in FIG. 9;

DESCRIPTION OF A PREFERRED EMBODIMENT

Figure 3:
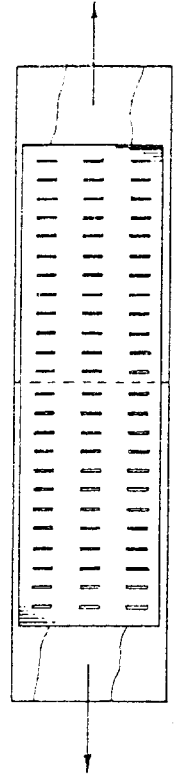
FIG. 3 is an illustration of a conventional connector plate connecting a joint in an EA orientation for obtaining a Vlrea value.
Figure 4:
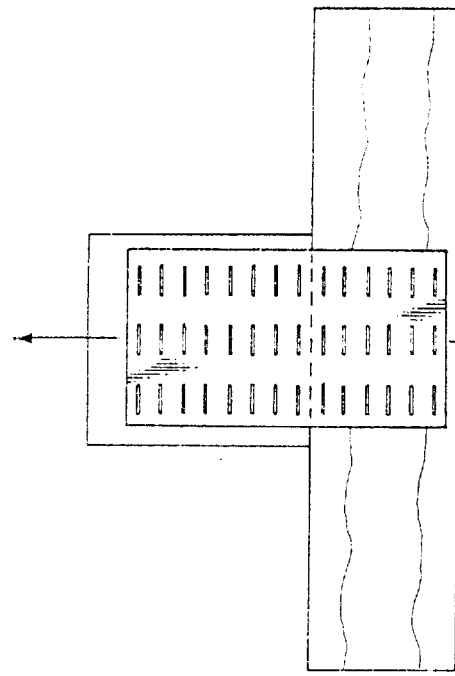
FIG. 4 is an illustration of a conventional connector plate connecting a joint in an EE orientation for obtaining a Vlree value.
Figure 1:
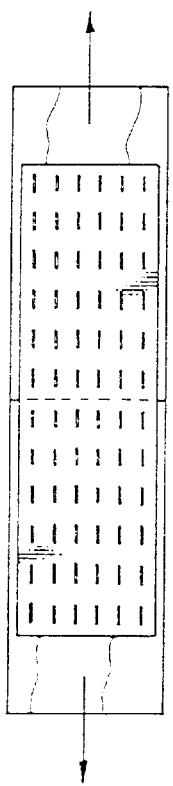
FIG. 1 is an illustration of a conventional connector plate connecting a joint in an AA orientation for obtaining a Vlraa value.
Figure 2:
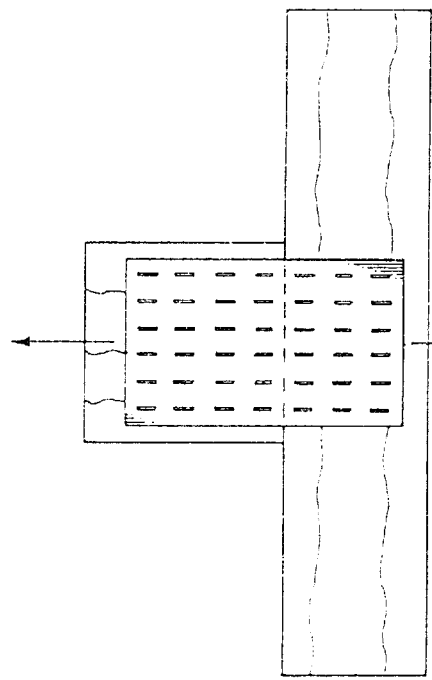
FIG. 2 is an illustration of a conventional connector plate connecting a joint in an AE orientation for obtaining a Vlrae value.
Figure 5:
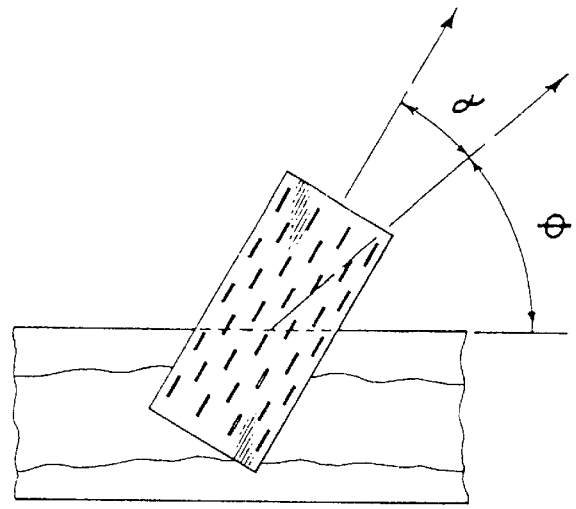
FIG. 5 is an illustration of a conventional connector plate connecting a joint in an arbitrary orientation.

The present invention will be described by referring to examples of how the invention can be made and used. Like reference characters are used throughout the several figures of the drawing to indicate like or corresponding parts. The invention utilizes an inventive concept to increase tooth holding values and steel efficiency of connector plates.

Figure 6:
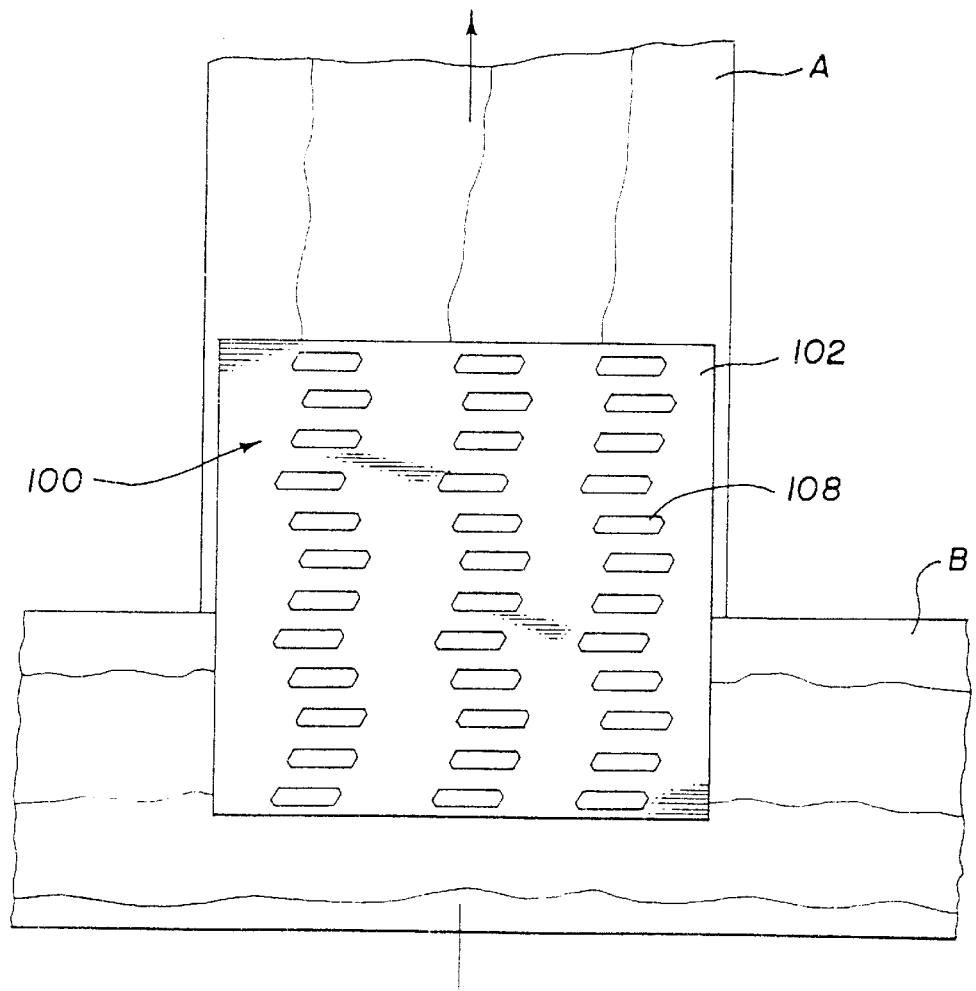
FIG. 6 is a view of a connector plate having a sinusoidal-wave tooth deployment joining two boards.

Referring to FIG. 6, a connector plate, generally designated by the numeral 100, is shown. Connector plate 100 is employed to join two truss members A and B, respectively, in a butt-joint fashion. Connector plate 100 has a base 102 with a plurality of pairs of teeth struck therefrom such as shown in FIG. 7. Each pair of teeth 104 and 106, respectively, are struck to form an elongated opening or slot 108 defined therebetween. Teeth 104 and 106 extend in a direction substantially perpendicular to the base 102 that forms the connector plate 100. As shown, teeth 104 and 106 are complementary oriented and extending from the connector plate base 102.

Referring to tooth 104, bend spine 110 extends longitudinally from base 102 to tip 116 of tooth 104. Bend spine 110 is offset from the longitudinal center-axis S (shown in FIG. 7) of slot 108 and is substantially perpendicular to a face plane defined by base 102. Asymmetrical portions 112 and 114 extend from bend spine 110. A substantially arcuate inner surface 117 is formed, as best shown in FIGS. 7 and 10. That is, the cross-sectional shape near tooth juncture of tooth 104 and base 102 is generally crescent or cupped-shaped forming an asymmetrical inner-change surface.

Referring to FIG. 8, a plane view of the outer surface of tooth 104 is shown. For clarity, only one tooth is described with the understanding that each of the teeth associated with connector plate 100 are substantially similar, but provide complementary pair-orientations as shown in FIG. 7.

Referring to FIG. 9, tooth 104 is shown with two asymmetrical portions 112 and 114, respectively, and bend spine 110 at the juncture of these portions. Extending from tip 116 is extruded edge 122 for facilitating insertion of tooth 104 into a board A, for example. Extruded edge 122 forms a general knife-like edge sufficient to facilitate insertion of tooth 104 into board A, for example. Formed between extruded edge 122 and reference 126 is angle 124. Angle 124 is commonly referred to as an air cut angle.

Lower portion of edge 122 extends to dimpled or corrugated region 128 in the general shape of a Gaussian curve having a base and an apex defined by edge 122. Corrugated region 128 has apex 129 extending inward toward spine 110. The base of the curve is best shown in FIG. 10. Corrugated region 128 extends into the surface plane generally defined by arcuate inner surface 120. This corrugation region is believed to longitudinally reinforce the tooth 104 when pressed into a board. That is, the corrugation region can flex with respect to the rest of the tooth structure, thereby dispersing some of the longitudinal force through this flexing.

As best illustrated in FIG. 9, opposing asymmetrical portion 114 of spine 110 has a second extruded edge 130, which also extends from tip 116. Between second edge 130 and reference 132 is defined a second angle 134. Generally, second angle 134 has a greater value than that of first angle 124 and is commonly formed by an angle referred to as the secondary flat. First and second edges 122 and 130 extend to substantially parallel to first and second tooth-body edges 120 and 122, accordingly.

As should be noted, the value of first and second angles 124 and 134 can vary respectively depending on fabrication parameters. For example, such parameters are the steel thickness and the material selected. For the preferred embodiment described herein, the material is preferably an ASTM A653 steel plate having a 20-gauge (about 0.91 mm) thickness. In the preferred embodiment, the steel plate is cold punched.

Figure 12:
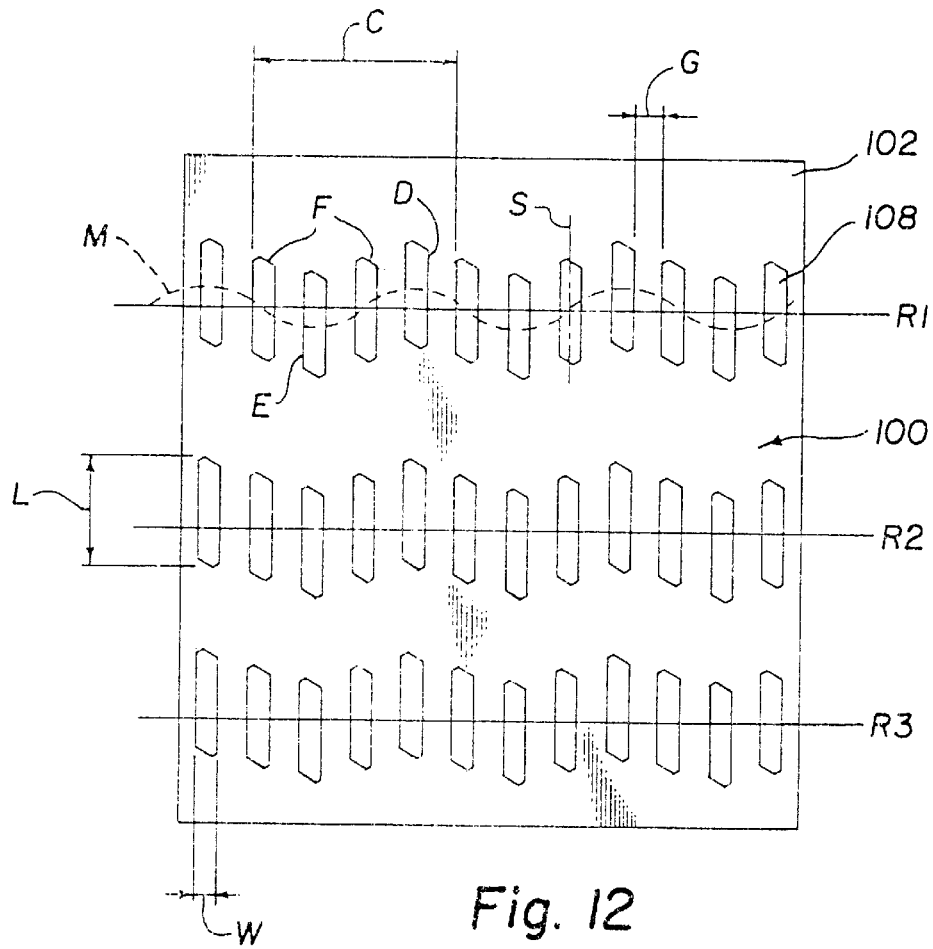
FIG. 12, is a detailed plan view of a connector plate having a sinusoidal-wave tooth deployment.

Referring to FIG. 12, a view of the back surface of connector plate 100 is shown illustrating the sinusoidal-slot arrangement of the tooth-pairs struck therefrom (see FIG. 7). Connector plate 100 has a plurality of rows R1, R2 and R3. For illustrative purposes, a sinusoidal waveform M is defined by the slots is represented in a dashed line along row R1. The sinusoidal waveform M is depicted as intersecting centerline points of the plurality of slots 108. A cycle C of the sinusoidal waveform M is designated by a maximum amplitude slot position D, a minimum slot position E, and at least two zero-point slot positions F. In the preferred embodiment shown, cycle C is about one-inch (about 25.4 mm). The maximum and minimum amplitude slot positions D and E, respectively, are relative to the zero-point slot positions and are offset by about one-sixteenth inch (about 1.58 mm), respectively. The distance G between slots 108 is about one-eighth inch (about 3.18 mm).

This sinusoidal-slot configuration has the benefit of increasing the Vlrea and Vlree tooth-holding values. As a result, connector plate 100 can have a reduced base 102 area and yet have similar strength characteristics as larger connector plates.

For the preferred embodiment shown, the length L of the slot is about one-half inch (about 12.7 mm). The width W of slot 108 is about one-eighth inch (3.18 mm). Briefly referring back to FIG. 9, the height H of each tooth is about three-eighth inches (about 9.52 mm).

Figure 11:
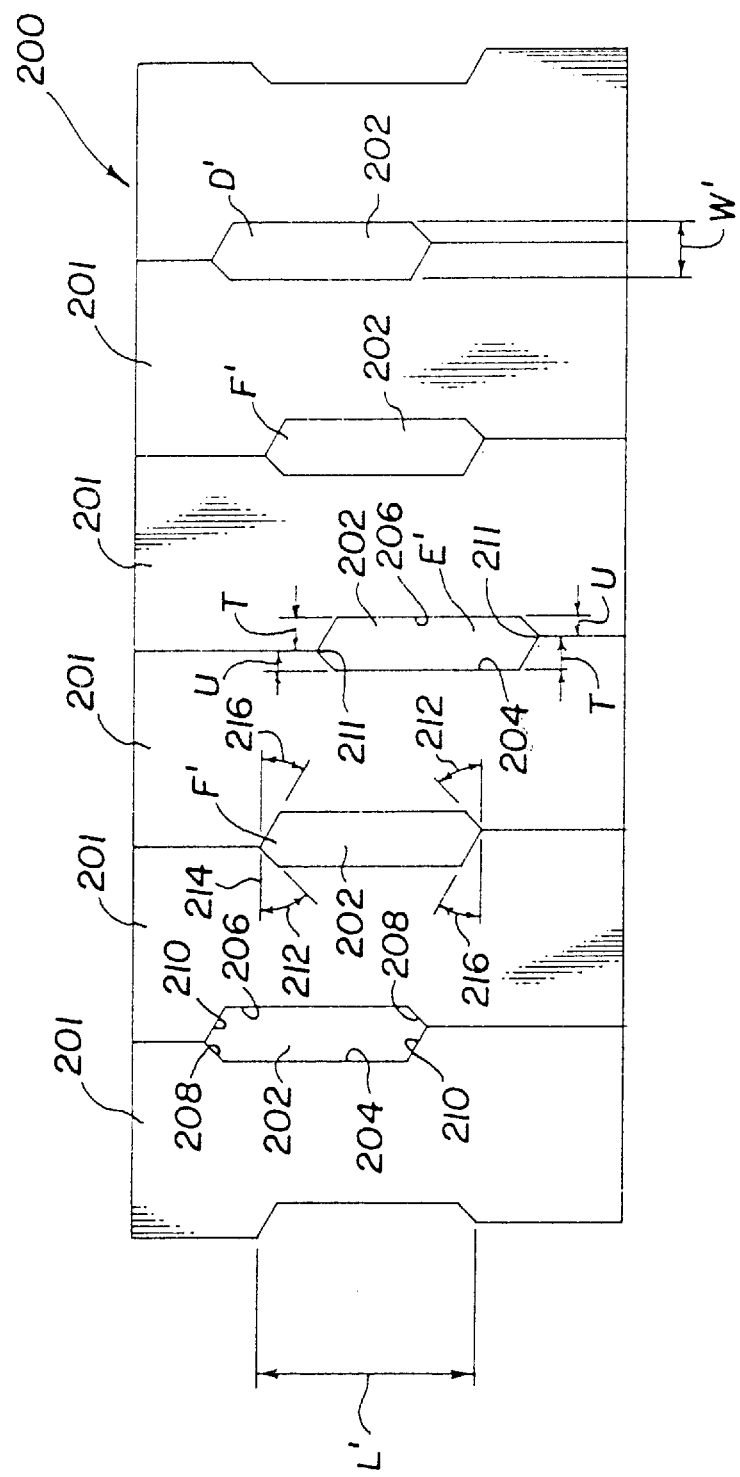
FIG. 11 is a plan view of die sections arranged to accept the punches for forming a connector plate's sinusoidal-wave tooth deployment.
Figure 13:
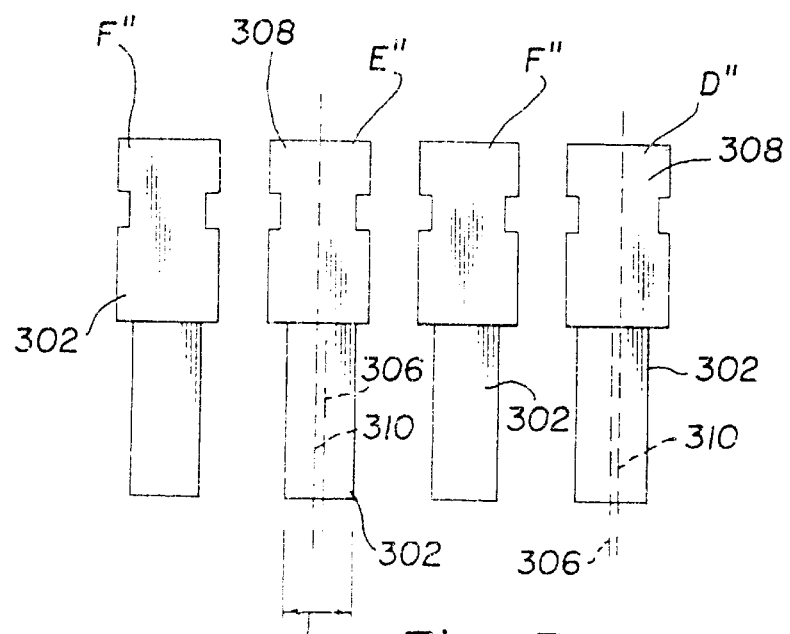
FIG. 13 is a plan view of offset punches used to form one cycle of the sinusoidal-wave tooth deployment.

The punches and dies for forming the teeth and slots are shown in FIGS. 11 and 13. Referring to FIG. 7, a set of dies 200 form a cycle C for the sinusoidal-slot pattern (see FIG. 11). For continuity between FIGS. 11 through 13, a nomenclature indicating corresponding manufacturing structures is adopted. For example, tooth pair F (FIG. 12) is formed by die cavity F' (FIG. 11) and punch F" (FIG. 13).

A die set 200 cycle has five die partitions 201. As shown, dies 200 define cavities 202 for receiving punches 302 (shown in FIG. 13). The cavities 202 have two substantially parallel, longitudinal side walls 204 and 206, respectively. The distance between the side walls 204 and 206 is W'. Each end of the longitudinal side walls extend into two slanted walls 208 and 210, respectively, forming an eccentric, asymmetrical apex 211 that is offset from a longitudinal center of the cavity 202.

Slanted side wall 208 forms an angle 212 with reference line 214. With respect to slanted side wall 208, the apex 211 is spaced apart from first longitudinal side wall 204 by the distance T. Slanted side wall 210 forms an angle 216 with reference line 218. With respect to slanted side wall 210, the apex 211 is spaced apart from longitudinal side wall 206 by the distance U.

In the preferred embodiment, the distance T is about 0.08 inches (about 2.03 mm), the distance U is about 0.04 inches (about 1.02 mm), angle 212 has a value of about 43.6 degrees, and angle 216 has a value of about 27.7 degrees. The width W' of the cavities 202 are about 0.12 inches (about 3.08 mm), and the length of the cavities 202 are about 0.50 inches (about 12.7 mm). As should be noted, both ends of the longitudinal walls 204 and 206 are complementary images of each other. This embodiment is preferred to reduce the amount of machining to produce the die set 200. But other modifications affecting these relationships still maintain the effects of this invention.

Referring to FIG. 13, the punch set 300 used to produce the slots are shown. Referring to one punch, for example, punch F", the punch has a cross-sectional area with heel angles that complement the silhouette of the die cavities 202. To punch sheet material through the die set, punches 302 are machined to have a smaller cross-sectional area sufficient to allow sheet material to be punched and formed in the die set 200 without causing punches 302 to be wedged and caught in the die set 200. That is, the structures are designed for a metal forming operation which causes shaping and thinning of the metal material taking place in the region between the slanted walls of the punches 302 to form eccentric bend spines 110 and corrugated regions 128 (see FIG. 7).

The punch tip surfaces have cutting surfaces and metal shaping surfaces which are known in the art. Of distinction to the invention is the offset centerlines of a standard punch holder used to obtain the sinusoidal pattern in the connector plate 100 as shown in FIGS. 11 and 16. Furthermore, the punch shanks 304 have eccentric pieces to that of die cavity 202. To accommodate the sinusoidal pattern, the punch set 300 has first and second centerline punches F", a maximum amplitude punch E", and a minimum amplitude punch D". The minimum and maximum amplitude punches D" and E", have punch shanks 304 with centerlines 306 offset from the punch base 308 centerlines 310. In the preferred embodiment, the offset is about one-sixteenth inch (about 1.59 mm).

In producing the connector plates of the present invention, the sheet metal material, or connector material, from which the connector plate is to be formed in incrementally passed between a series of punches and corresponding dies. The punches and dies are arranged so that each punch will strike the metal material and pass through so as to extend into a cavity of a corresponding die. When the punch extends into the cavity of the dies, a substantial portion of the space between lateral side edges of each punch and corresponding die is less than the thickness of the sheet material. Thus, as the punch enters into the cavity of the die metal forming occurs whereby the teeth are reshaped by wiping the metal between the side walls of the punch and the die cavity. In this manner, the offset spines 110 of the teeth are formed offset from the longitudinal axis S of the slots 108, as shown in FIG. 7. As the punch is fully extended into the die cavity, each tooth is forced into a position substantially vertically aligned with the respective tooth.

From the foregoing, disclosed are the various structures of an improved connector plate. But, various modifications may suggest themselves to those skilled in the art without departing from the spirit and scope of the invention, as defined in the appended claims. Also, those skilled in the art may prefer to utilize some of the features and advantages of the invention without using all of the features. The invention is not to be restricted to the specific forms shown, or the uses mentioned, except as to the extent required by the claims.

Having described the invention, what is claimed is:

1. A connector plate comprising a metal plate having a plurality of teeth integrally projecting from said plate and an elongated slot adjacent each said tooth, said slots having spaced side edges and wherein said teeth are each disposed at the end of one of said slots, said slots being arranged on said plate in a plurality of adjacent spaced rows with each of said slots extending transverse to said rows and with each of said rows consisting primarily of a single row of slots being offset in a sinusoidal pattern having at least one cycle and wherein each cycle has at least a maximum amplitude slot position, a minimum amplitude slot position, and at least two zero-point slot positions.

2. A connector plate as defined in claim 1, wherein each tooth has a bend line extending from a base of said tooth to a tip of said tooth, said bend line being transversely offset relative to a longitudinal axis of said tooth such that said tooth is divided into an asymmetrical inner-channel surface.

3. A connector plate as defined in claim 1 wherein said plate is rectangular.

4. A connector plate as defined in claim 1 wherein said plate is galvanized steel plate.

5. A connector plate as defined in claim 1 wherein said at least one cycle is about 25.4 mm.

6. A connector plate as defined in claim 1 wherein said slots each have substantially similar dimensions.

7. A connector plate as defined in claim 1 wherein said slots are offset about one-sixteenth inch.

8. A connector plate as defined in claim 1 wherein each said slot has first and second reverse-oriented mirror-image teeth extending from said plate at opposing ends of each said slot.

9. A connector plate as defined in claim 1 wherein said plate is generally quadrilateral.

10. A connector plate as defined in claim 1 wherein said teeth are arranged so that a tooth is disposed at each end of each slot.

11. A connector plate as defined in claim 1, wherein adjacent slots in each of said rows are spaced equal distance apart.

12. A connector plate as defined in claim 1 wherein each said row comprises an area lying between a pair of parallel lines extending through said maximum and minimum amplitude positions, and wherein each row is spaced from each adjacent row.

13. A connector plate comprising a metal plate having a plurality of teeth integrally projecting from said plate and an elongated slot adjacent each said tooth, said slots having spaced side edges and wherein said teeth are each disposed at the end of one of said slots, said slots being arranged on said plate in a plurality of spaced rows with each of said slots extending transverse to said rows and with the slot in each of said rows being offset in a sinusoidal pattern having at least one cycle and wherein each cycle has at least a maximum amplitude slot position, a minimum amplitude slot position and at least two zero-point slot positions, wherein each said tooth extends substantially perpendicular to said plate from each opposing end of each of said elongated slots, each tooth having a base with a bend spine, said bend spine originating apart from the longitudinal axis of said slot and extending to a tip and with a first and a second asymmetrical portion, extruded edges on said asymmetrical portions with said extruded edges extending generally laterally from the bend spine and tapering to said tip, said first asymmetrical portion having less taper angle than said second portion, said second portion having a taper with a generally extruded outer edge having a thickness less than a thickness about said bend spine of said tooth; and a tapered corrugation formed in said second portion adjacent said tooth base, said corrugation extending from the outer edge of said second portion with a tapered end extending towards said bend spine.

14. A connector plate comprising a metal plate having a plurality of teeth integrally projecting from said plate and an elongated slot adjacent each said tooth, said slots having spaced side edges and wherein said teeth are each disposed at the end of one of said slots, all of said slots being arranged on said plate in a plurality of adjacent spaced rows with each of said slots extending transverse to said rows and with the adjacent slots in said rows being longitudinally overlapping and with the slots in said rows being offset in a sinusoidal pattern having at least one cycle and wherein each cycle has at least a maximum amplitude slot position, a minimum amplitude slot position, and at least two zero-point slot positions.

15. A connector plate comprising a metal plate having a plurality of teeth integrally projecting from said plate and an elongated slot adjacent each said tooth, said slots having generally parallel extending side edges and wherein said teeth are each disposed at the end of one of said slots, all of said slots being arranged on said plate in a plurality of adjacent spaced rows with said slots extending transverse to said rows and with the adjacent slots in said rows being longitudinally overlapping and with the teeth in each said rows being offset in a sinusoidal pattern having at least one cycle and wherein each cycle has at least a maximum amplitude tooth position, a minimum amplitude tooth position, and at least two zero-point tooth positions.

\* \* \* \* \*